United States Patent
El-Keyi et al.

(10) Patent No.: US 12,160,290 B2
(45) Date of Patent: Dec. 3, 2024

(54) UPLINK SINGLE USER MULTIPLE INPUT MULTIPLE OUTPUT (SU-MIMO) PRECODING IN WIRELESS CELLULAR SYSTEMS

(71) Applicant: Telefonaktiebolaget LM Ericsson (publ), Stockholm (SE)

(72) Inventors: Amr El-Keyi, Kanata (CA); Chandra Bontu, Nepean (CA); Svante Bergman, Hägersten (SE); Jagadish Ghimire, Kanata (CA); Ping Wu, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 390 days.

(21) Appl. No.: 17/627,884

(22) PCT Filed: Aug. 26, 2019

(86) PCT No.: PCT/IB2019/057161
§ 371 (c)(1),
(2) Date: Jan. 18, 2022

(87) PCT Pub. No.: WO2021/038273
PCT Pub. Date: Mar. 4, 2021

(65) Prior Publication Data
US 2022/0263546 A1    Aug. 18, 2022

(51) Int. Cl.
H04B 7/0456    (2017.01)
H04B 7/0452    (2017.01)
H04B 17/336    (2015.01)

(52) U.S. Cl.
CPC ......... *H04B 7/0452* (2013.01); *H04B 7/0482* (2013.01); *H04B 7/0486* (2013.01); *H04B 17/336* (2015.01)

(58) Field of Classification Search
None
See application file for complete search history.

(56) References Cited

U.S. PATENT DOCUMENTS

2016/0204844 A1\*  7/2016  Sandberg ............. H04B 7/0486
                                                    370/252

FOREIGN PATENT DOCUMENTS

| WO | 2012/045143 A1 | 4/2012 |
| WO | 2015/023218 A1 | 2/2015 |

OTHER PUBLICATIONS

International Search Report and Written Opinion dated Mar. 12, 2020 issued in PCT Application PCT/IB2019/057161, consisting of 11 pages.

\* cited by examiner

*Primary Examiner* — Minh Trang T Nguyen
(74) *Attorney, Agent, or Firm* — Weisberg I.P. Law, P.A.

(57) ABSTRACT

A method and network node for single user multiple input multiple output (SU-MEMO) codebook-based precoder selection and for rank adaptation are provided. According to one aspect, a method includes, for each one of a plurality of rank hypotheses: selecting a precoder matrix based on an uplink transmit covariance matrix; and estimating a respective information carrying capacity, ICC, for the rank hypothesis based at least in part on the selected precoder matrix. The method further includes selecting an uplink SU-MIMO precoding matrix based at least in part on the estimated ICC for each rank hypothesis.

21 Claims, 7 Drawing Sheets

UPLINK SINGLE USER MULTIPLE INPUT MULTIPLE OUTPUT (SU-MIMO) PRECODING IN WIRELESS CELLULAR SYSTEMS

CROSS-REFERENCE TO RELATED APPLICATION

This application is a Submission Under 35 U.S.C. § 371 for U.S. National Stage Patent Application of International Application Number: PCT/IB2019/057161, filed Aug. 26, 2019 entitled, "UPLINK SINGLE USER MULTIPLE INPUT MULTIPLE OUTPUT (SU-MIMO) PRECODING IN WIRELESS CELLULAR SYSTEMS," the entirety of which is incorporated herein by reference.

TECHNICAL FIELD

This disclosure relates to wireless communication and in particular, to uplink single user multiple input multiple output (SU-MIMO) precoding in a wireless cellular communication system.

BACKGROUND

Massive MIMO provides significant capacity improvements to wireless cellular systems via spatial multiplexing of multiple transmission layers, either to a single user (SU-MIMO) or to multiple users (MU-MIMO). Spatial multiplexing is accomplished by mapping the transmitted layers to the available antennas using a precoder. In $3^{rd}$ Generation Partnership Project (3GPP) Fourth Generation (4G) and Fifth Generation (5G) wireless systems (5G is also known as New Radio (NR)), the uplink precoder selection is performed by the base station (eNB or gNB) and is signaled to the wireless device (WD) in the uplink grant. Codebook-based uplink SU-MIMO refers to selection of a precoding matrix to be used by the WD in its uplink transmission from a finite set of available precoders.

Adding support for uplink SU-MIMO can significantly boost the uplink cell throughput by allowing the wireless device (WD) to transmit multiple layers in the uplink. Optimal selection of the uplink transmission rank and precoding matrix allows the WD to exploit the available degrees of freedom based on the channel state. When the WD is in good radio conditions, i.e., high channel gain and rich scattering, multiple layers can be scheduled for the WD. On the other hand, when the WD is in bad radio conditions, it is more beneficial to use all the available power in transmitting a single uplink layer. Nevertheless, selecting the uplink precoder such that the uplink transmission is focused in the direction of the base station can still bring significant performance improvements to the system as compared with other precoder selection arrangements, and increase the uplink coverage.

SUMMARY

Some embodiments advantageously provide a method and system for uplink single user multiple input multiple output (SU-MIMO) precoding in a wireless cellular communication system.

A network node and methods for uplink SU-MIMO codebook-based precoding selection in wireless systems, e.g., LTE and New Radio (NR), are described herein. Computationally-efficient algorithms for rank adaptation and precoding selection are disclosed that perform precoding selection using the uplink transmit covariance matrix and perform rank selection by mapping the estimated signal to interference-plus-noise ratio (SINR) of each rank hypothesis to a corresponding information carrying capacity (ICC) estimate and selecting the rank hypothesis that yields the highest ICC. An SU-MIMO link adaptation algorithm is disclosed that supports multiple uplink layers by using multiple ICC estimators together with periodic rank polling to ensure accurate ICC estimation for each rank hypothesis. The uplink SU-MIMO algorithms set forth herein do not require extensive sounding resources as only the uplink transmit covariance matrix is utilized for precoding selection instead of the instantaneous channel state information.

According to one aspect, a method in a network node for single user multiple input multiple output, SU-MIMO, codebook-based precoder selection and for rank adaptation is provided. The method includes, for each one of a plurality of rank hypotheses: selecting a precoder matrix based on an uplink transmit covariance matrix; and estimating a respective information carrying capacity, ICC, for the rank hypothesis based at least in part on the selected precoder matrix. The method further includes selecting an uplink single user multiple input multiple output, SU-MIMO, precoding matrix based at least in part on the estimated ICC for each rank hypothesis.

According to this aspect, in some embodiments, the ICC estimation includes determining an average signal to interference and noise ratio, SINR, of an uplink transmission by averaging an estimated SINR over a plurality of active frequency bands and layers. In some embodiments, estimation of the estimated SINR includes subtracting a received signal power from a total received power. In some embodiments, the method further includes determining a total ICC for a rank by mapping a signal to interference plus noise ratio, SINR, for each of a plurality of frequencies to the ICC corresponding to a rank for a target block error rate. In some embodiments, the method further includes selecting a rank hypothesis that provides a largest ICC upon which to base selection of the SU-MIMO precoding matrix. In some embodiments, the method further includes transmitting the selected rank hypothesis and associated selected SU-MIMO precoding matrix to a wireless device. In some embodiments, the method further includes determining a beam forming gain obtained from use of a precoder matrix to determine the ICC. In some embodiments, a precoder matrix is selected to maximize a performance measure according to an objective criterion. In some embodiments, the plurality of rank hypotheses are limited based on a spatial support test. In some embodiments, rank polling is applied to force an uplink transmission to a certain number of layers.

According to another aspect, a network node is configured for single user multiple input multiple output, SU-MIMO, codebook-based precoder selection and for rank adaptation. The network node includes processing circuitry configured to: for each one of a plurality of rank hypotheses: select a precoder matrix based on an uplink transmit covariance matrix; and estimate a respective information carrying capacity, ICC, for the rank hypothesis based at least in part on the selected precoder matrix. The processing circuitry is further configured to select an uplink single user multiple input multiple output, SU-MIMO, precoding matrix based at least in part on the estimated ICC for each rank hypothesis.

According to this aspect, in some embodiments, the ICC estimation includes determining an average signal to interference and noise ratio, SINR, of an uplink transmission by averaging an estimated SINR over a plurality of active frequency bands and layers. In some embodiments, estimation of the estimated SINR includes subtracting a received signal power from a total received power. In some embodiments, the processing circuitry is further configured to determine a total ICC for a rank by mapping a signal to interference plus noise ratio, SINR, for each of a plurality of frequencies to the ICC corresponding to a rank for a target block error rate. In some embodiments, the processing circuitry is further configured to select a rank hypothesis that provides a largest ICC upon which to base selection of the SU-MIMO precoding matrix. In some embodiments, the processing circuitry is further configured to transmit the selected rank hypothesis and associated selected SU-MIMO precoding matrix to a wireless device. In some embodiments, the processing circuitry is further configured to determine a beam forming gain obtained from use of a precoder matrix to determine the ICC. In some embodiments, a precoder matrix is selected to maximize a performance measure according to an objective criterion. In some embodiments, the plurality of rank hypotheses are limited based on a spatial support test. In some embodiments, rank polling is applied to force an uplink transmission to a certain number of layers.

According to yet another aspect, a method in a network node for single user multiple input multiple output, SU-MIMO, codebook-based precoder selection and for rank adaptation is provided. The method includes, for each one of a plurality of rank hypotheses selected based on a spatial support test: selecting a precoder matrix based on an uplink transmit covariance matrix; and estimating a respective information carrying capacity, ICC, for the rank hypothesis based at least in part on the selected precoder matrix. The method further includes selecting an uplink single user multiple input multiple output, SU-MIMO, precoding matrix corresponding to an estimated ICC having a largest value. The method also includes transmitting to a wireless device a rank hypothesis corresponding to an estimated ICC having a largest value.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
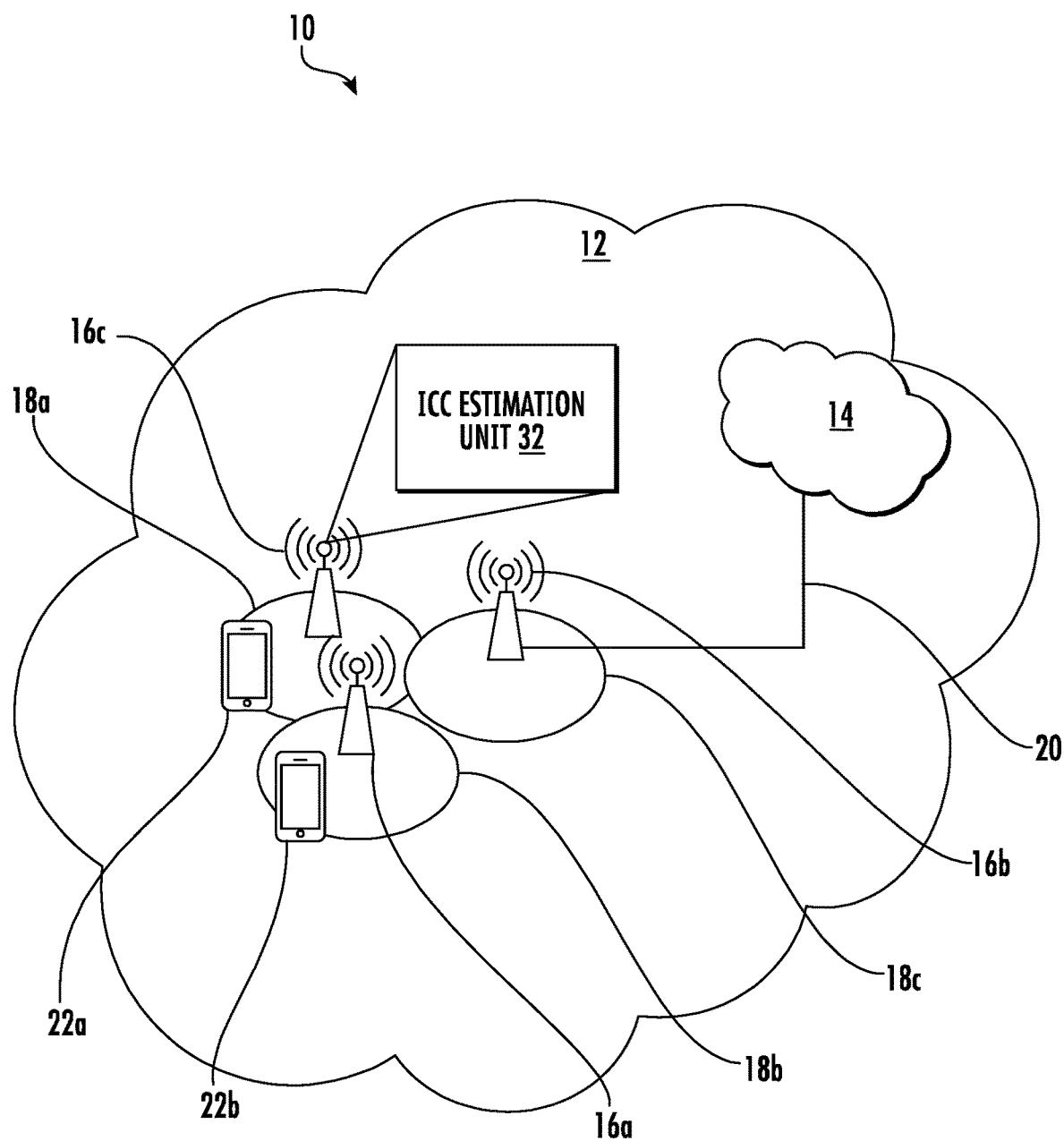
FIG. 1 is a schematic diagram of an exemplary network architecture illustrating a communication system according to the principles in the present disclosure.

Before describing in detail exemplary embodiments, it is noted that the embodiments reside primarily in combinations of apparatus components and processing steps related to uplink single user multiple input multiple output (SU-MIMO) precoding in a wireless cellular communication system. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate, and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), relay node, integrated access and backhaul (IAB) node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments can provide significant gain in uplink cell throughput s compared with known uplink transmission arrangements. System simulation results show that an uplink SU-MIMO algorithm can provide up to a 100% improvement the uplink cell throughput over legacy, i.e., existing, 1-layer uplink transmissions from a fixed antenna port. Some embodiments have low computational complexity. Some embodiments do not need instantaneous channel state information, i.e., only the uplink transmit covariance matrix is needed for precoder selection.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

A network node 16 is configured to include an ICC estimation unit 32 which is configured to estimate a respective information carrying capacity, ICC, for the rank hypothesis based at least in part on the selected precoder matrix. The network node 16 is also configured to include a precoder selector 56 which is configured to select a precoder matrix based on an uplink transmit covariance matrix. The network node 16 is also configured to include an SU-MIMO precoding matrix selector 58 which is configured to select an uplink SU-MIMO precoding matrix based at least in part on the estimated ICC for each rank hypothesis.

Example implementations, in accordance with an embodiment, of the WD 22, network node 16 and host computer 24 discussed in the preceding paragraphs will now be described with reference to FIG. 2.

The communication system 10 includes a network node 16 provided in a communication system 10 and including hardware 38 enabling it to communicate with the WD 22. The hardware 38 may include a radio interface 42 for setting up and maintaining at least a wireless connection 46 with a WD 22 located in a coverage area 18 served by the network node 16. The radio interface 42 may be formed as or may include, for example, one or more RF transmitters, one or more RF receivers, and/or one or more RF transceivers. Typically, the radio interface 42 has an array of antennas 43.

In the embodiment shown, the hardware 38 of the network node 16 further includes processing circuitry 48. The processing circuitry 48 may include a processor 50 and a memory 52. In particular, in addition to or instead of a processor, such as a central processing unit, and memory, the processing circuitry 48 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 50 may be configured to access (e.g., write to and/or read from)

the memory 52, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 52, or stored in external memory (e.g., database, storage array, network storage device, etc.) accessible by the network node 16 via an external connection. The software 44 may be executable by the processing circuitry 48. The processing circuitry 48 may be configured to control any of the methods and/or processes described herein and/or to cause such methods, and/or processes to be performed, e.g., by network node 16. Processor 50 corresponds to one or more processors 50 for performing network node 16 functions described herein. The memory 52 is configured to store data, programmatic software code and/or other information described herein. In some embodiments, the software 44 may include instructions that, when executed by the processor 50 and/or processing circuitry 48, causes the processor 50 and/or processing circuitry 48 to perform the processes described herein with respect to network node 16. For example, processing circuitry 48 of the network node 16 may include an ICC estimation unit 32 which is configured to estimate a respective information carrying capacity, ICC, for the rank hypothesis based at least in part on the selected precoder matrix. The processing circuitry 48 may also include a precoder selector 56 which is configured to select a precoder matrix based on an uplink transmit covariance matrix. The processing circuitry may also include an SU-MIMO precoding matrix selector 58 which is configured to select an uplink SU-MIMO precoding matrix based at least in part on the estimated ICC for each rank hypothesis.

The communication system 10 further includes the WD 22 already referred to. The WD 22 may have hardware 60 that may include a radio interface 62 configured to set up and maintain a wireless connection 46 with a network node 16 serving a coverage area 18 in which the WD 22 is currently located. The radio interface 62 may be formed as or may include, for example, one or more RF transmitters, one or more RF receivers, and/or one or more RF transceivers. Typically, the radio interface 42 has an array of antennas 63.

The hardware 60 of the WD 22 further includes processing circuitry 64. The processing circuitry 64 may include a processor 66 and memory 68. In particular, in addition to or instead of a processor, such as a central processing unit, and memory, the processing circuitry 64 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 66 may be configured to access (e.g., write to and/or read from) memory 68, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 70, which is stored in, for example, memory 68 at the WD 22, or stored in external memory (e.g., database, storage array, network storage device, etc.) accessible by the WD 22. The software 70 may be executable by the processing circuitry 64. The software 70 may include a client application 72. The client application 72 may be operable to provide a service to a human or non-human user via the WD 22.

The processing circuitry 64 may be configured to control any of the methods and/or processes described herein and/or to cause such methods, and/or processes to be performed, e.g., by WD 22. The processor 66 corresponds to one or more processors 66 for performing WD 22 functions described herein. The WD 22 includes memory 68 that is configured to store data, programmatic software code and/or other information described herein. In some embodiments, the software 70 and/or the client application 72 may include instructions that, when executed by the processor 66 and/or processing circuitry 64, causes the processor 66 and/or processing circuitry 64 to perform the processes described herein with respect to WD 22.

Figure 2:
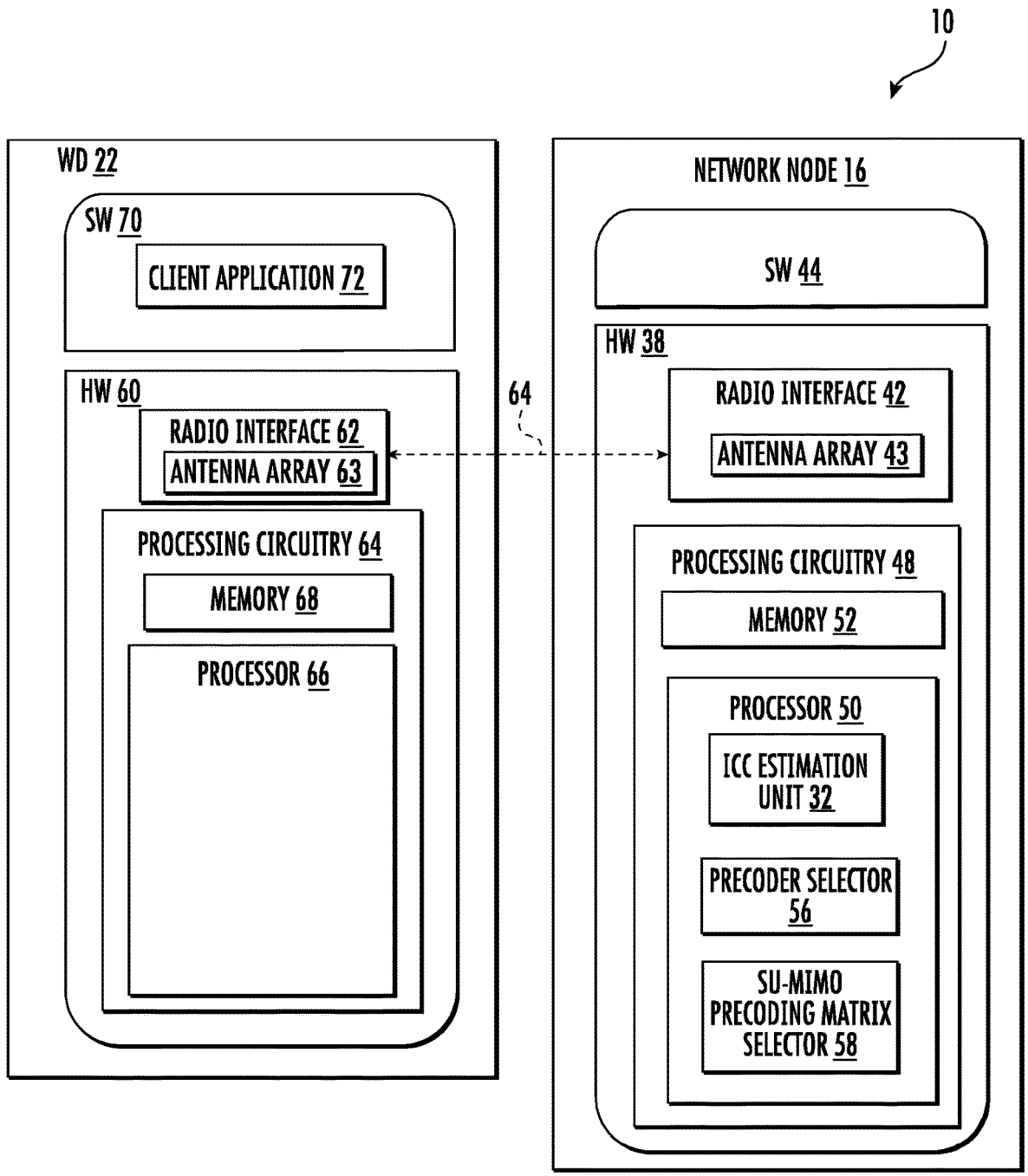
FIG. 2 is a block diagram of a network node in communication with a wireless device over a wireless connection according to some embodiments of the present disclosure.

In some embodiments, the inner workings of the network node 16 and WD 22 may be as shown in FIG. 2 and independently, the surrounding network topology may be that of FIG. 1.

The wireless connection 46 between the WD 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 1 and 2 show various "units" such as ICC Estimation unit 32 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 3:
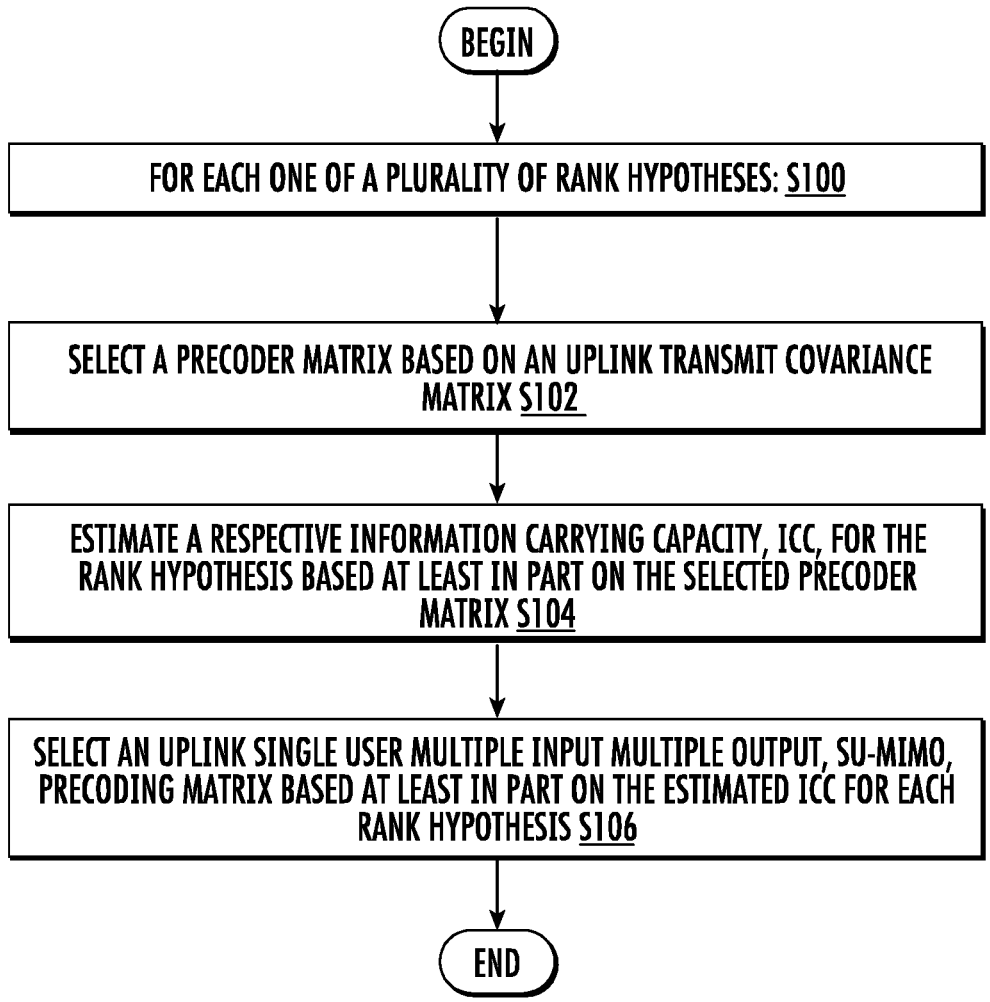
FIG. 3 is a flowchart of an exemplary process in a network node according to some embodiments of the present disclosure.

FIG. 3 is a flowchart of an exemplary process in a network node 16 according to some embodiments of the present disclosure. One or more blocks described herein may be performed by one or more elements of network node 16 such as by one or more of processing circuitry 48 (including the ICC estimation unit 32), processor 50 and/or radio interface 42. Network node 16 such as via processing circuitry 48 and/or processor 50 and/or radio interface 42 is configured to, for each one of a plurality of rank hypotheses (Block S100): select a precoder matrix based on an uplink transmit covariance matrix (Block S102) and estimate a respective information carrying capacity, ICC, for the rank hypothesis based at least in part on the selected precoder matrix (Block S104). The process also includes selecting an uplink SU-MIMO precoding matrix based at least in part on the estimated ICC for each rank hypothesis (Block S106).

Figure 4:
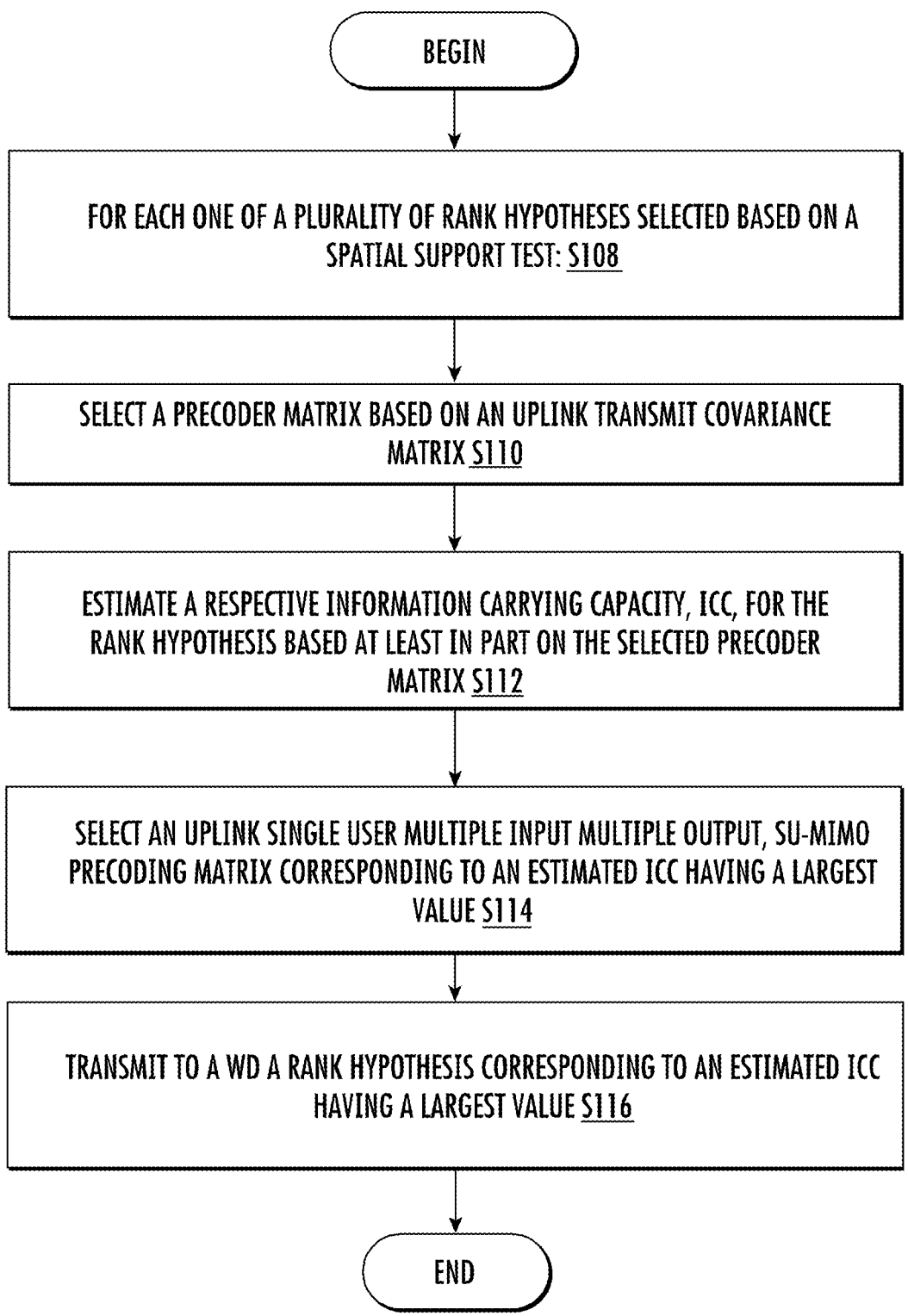
FIG. 4 is a flowchart of an alternative exemplary process in a network node according to some embodiments of the present disclosure.

FIG. 4 is a flowchart of an alternative exemplary process in a network node 16 according to some embodiments of the present disclosure. The process includes, such as via processing circuitry 48 and/or processor 50 and/or radio interface 42, for each one of a plurality of rank hypotheses selected based on a spatial support test (Block S108): selecting a precoder matrix based on an uplink transmit covariance matrix (Block S110); and estimating a respective information carrying capacity, ICC, for the rank hypothesis based at least in part on the selected precoder matrix (Block S112). The process also includes selecting an uplink SU-MIMO precoding matrix corresponding to an estimated ICC having a largest value (Block S114). The process further includes transmitting to a wireless device a rank hypothesis corresponding to an estimated ICC having a largest value (Block S116).

Having described the general process flow of arrangements of the disclosure and having provided examples of hardware and software arrangements for implementing the processes and functions of the disclosure, the sections below provide details and examples of arrangements for uplink single user multiple input multiple output (SU-MIMO) precoding in a wireless cellular communication system.

Consider a MIMO wireless cellular system having a network node 16 (for example, a base station) and multiple WDs. For the sake of simplicity, this description focusses on the connection between the network nodes 16 and a single WD 22. For example, assume that a network node 16 has an N-element antenna array 43 and that the WD 22 is equipped with an M-element antenna array 63. Let H(f,t) denote the N×M matrix containing the coefficient of the uplink channel from the WD 22 to the network node 16 at time t and frequency f. The WD 22 transmits, such as via the radio interface 62, L independent data streams (layers) to the network node 16 (e.g., eNB, gNB) using the M×L wideband precoding matrix $W_L(t)$. The precoding matrix may be used for all the available frequency bands assigned to the WD 22 for its uplink transmission and may be signaled to the WD 22 by the radio interface 42 of the network node 16 prior to time instant t together with the uplink transmission grant. The precoding matrix $W_L(t)$ may be selected from a finite codebook $\Omega_L$ containing all rank L precoders that can be supported by the WD 22 and $1 \leq L \leq L_{max}$ where $L_{max} \leq \min(M,N)$ is the maximum number of layers that can be transmitted by the WD 22 in the uplink.

The NX1 vector containing the uplink signal received via the antenna array 43 of the network node 16 at time t and frequency f is given by $$y(f,t) = \sqrt{p(f,t)} H(f,t) W_L(t) s_L(f,t) + n(f,t)$$

where p(f,t) is the transmission power of the WD 22 on frequency bin f and time t, $s_L$(f,t) is the L×1 vector containing the transmitted data symbols by the WD 22, and n(f,t) is the NX1 vector containing the received noise and interference at time t and frequency f. The network node 16 may employ the receiver function V( ) to estimate both the transmitted data symbols, i.e., $\hat{s}_L$(f,t)=V(y(f,t)), and the received SINR associated with each of the L transmission layers, $\gamma_i$(f,t) where $1 \leq i \leq L$.

An example of a system and algorithm to determine a number of uplink SU-MIMO transmission layers L and select the precoding matrix $W_L$ are described. The system aims to maximize the information carrying capacity (ICC) of the uplink transmission, i.e., maximize the number of bits that can be correctly decoded with the target error rate at the base station.

Figure 5:
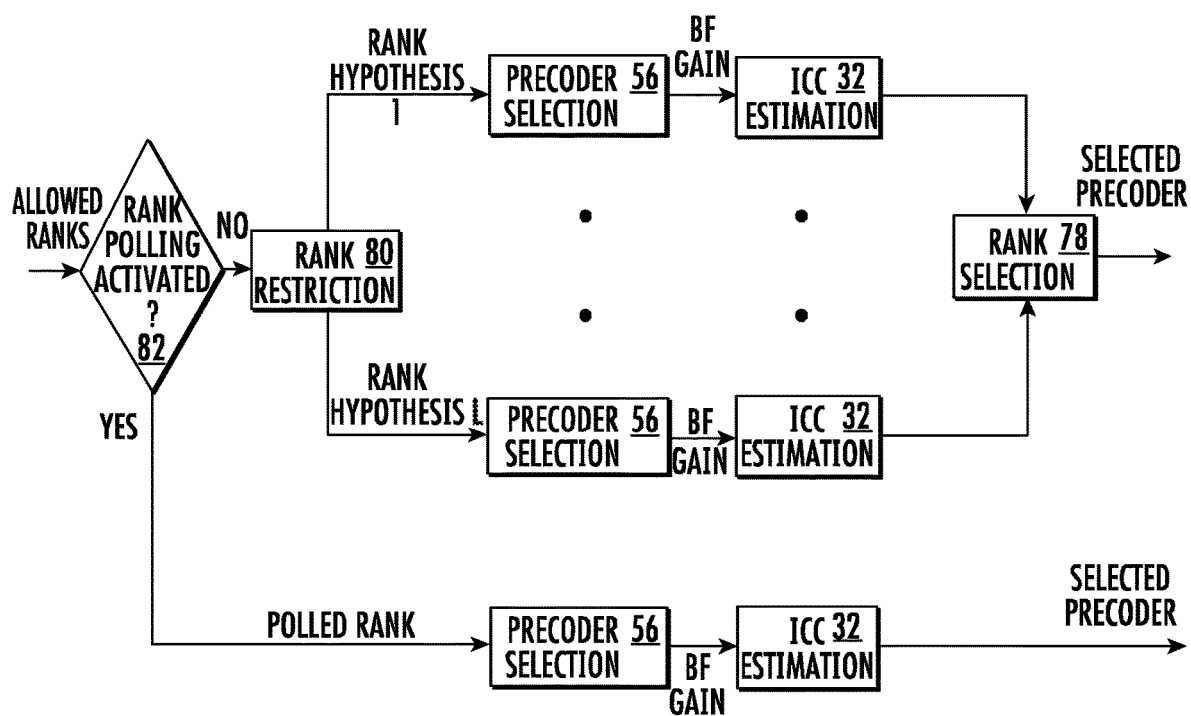
FIG. 5 shows a block diagram of an uplink SU-MIMO rank and precoder selection algorithm according to principles set forth herein.

FIG. 5 shows a block diagram of an embodiment of the uplink SU-MIMO rank and precoder selection algorithm that may be performed via the processing circuitry 48, and more particularly in some embodiments, via the processor 50 executing software/firmware to perform the functions of ICC estimation unit 32, precoder selector 56 (and SU-MIMO precoding matrix selector 58). The algorithm may further include performing the functions of rank selection unit 78, rank restriction unit 80, and rank polling query unit 82. In other words, the algorithm may be implemented by one or more routines written in software instructions that are executed by the processor 50. The method employs multiple ICC estimation units 32 where each ICC estimation unit 32 is associated with a specific transmission rank hypothesis, i.e., number of layers. For each rank hypothesis, the precoder resulting in the greatest beamforming gain may be selected by precoder selection unit 56 and the resulting beamforming gain may be used by the associated ICC estimation unit 32 to calculate the ICC. The transmission rank may then be selected by rank selection unit 78 to yield the maximum ICC and the associated precoder may be used in the uplink transmission. As shown in FIG. 5, the number of allowed transmission ranks can be restricted by the rank restrictor 80 based on the capability of the transmitting WD 22, the spatial support of the channel and/or the availability of uplink channel state information at the base station. Rank restriction 80 can also be performed to limit the number of rank hypothesis to decrease the computational complexity of the algorithm. Furthermore, the algorithm allows forcing of the transmission rank to a specific value via rank polling 82 regardless of the resulting ICC of the polled rank. The purpose of rank polling is to allow continuous updating of the state of the ICC estimation units 32 of all the possible rank hypotheses, i.e., rank polling may be performed for a certain rank if no uplink transmissions were recently scheduled with this rank.

Figure 6:
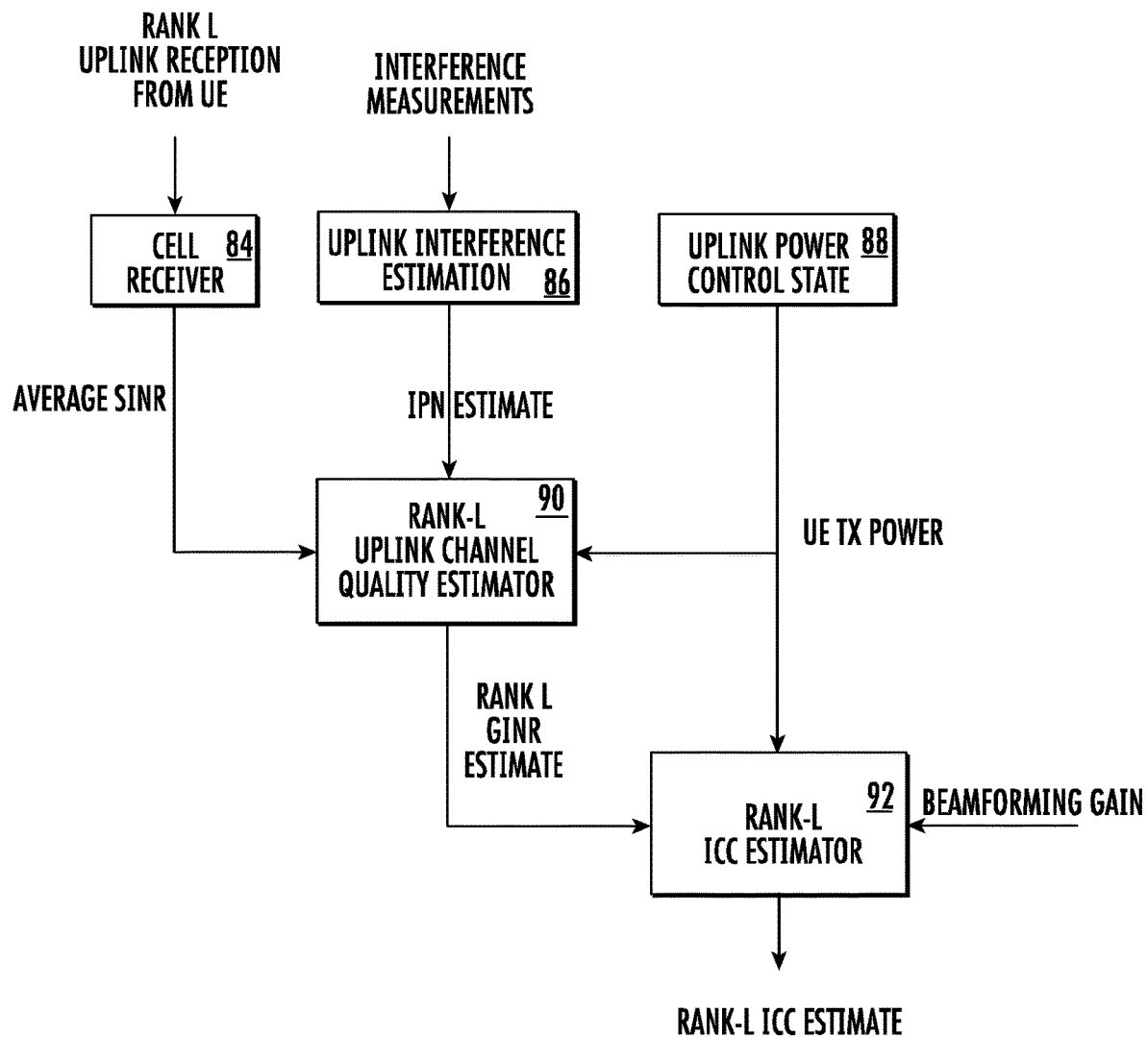
FIG. 6 is a block diagram of the information carrying capacity (ICC) estimation algorithm associated with rank-L hypothesis according to principles set forth herein.

FIG. 6 is a block diagram of an example of the information carrying capacity (ICC) estimation algorithm associated with rank-L hypothesis performed by ICC estimation unit 32. The algorithm computes the average output SINR by the cell receiver 84 for the last uplink transmission with L layers by averaging the estimated SINR over all the active frequency bands and layers, i.e., $$\gamma_L(t_L) = \frac{1}{L N_{f_L}} \sum_f \sum_{i=1}^{L} \gamma_i(f, t_L)$$

where $N_{f_L}$ is the number of frequency bins used in the last rank L transmission that occurred at time instant $t_L$. The algorithm also estimates, via uplink interference estimation 86, the interference-plus-noise (IPN) of the uplink for each frequency bin, I(f,$t_L$), e.g., by subtracting the received desired signal power from the total received power at this frequency bin. An average IPN estimate $\bar{I}$ may be obtained by averaging over all the available frequency bins, i.e., $$\bar{I}(t_L) = \frac{1}{N_f} \sum_f I(f, t_L)$$

where $N_f$ is the total number of frequency bins. In addition, the average WD 22 transmission power per frequency bin is calculated, via uplink power control state unit 88, as $$\bar{P}(t_L) = \frac{1}{N_{f_L}} \sum_f p(f, t_L)$$

The uplink channel quality estimator 90 estimates the rank-L uplink channel gain using the estimates of the average SINR, average IPN, and the average WD 22 transmission power per frequency bin as $$G_L(t_L) = \frac{\gamma_L(t_L) \bar{I}(t_L)}{\bar{P}(t_L)}$$

The channel gain $G_L(t_L)$ is filtered in the time domain to reduce temporal variations and obtain a stable and accurate measure of the average rank-L uplink channel gain $\overline{G_L}$.

Using the average channel gain and uplink IPN, the rank-L gain to interference-plus-noise ratio, $GINR_L(f,t_L)$ may be calculated, via Rank-L ICC estimator 92 for each frequency bin as $$GINR_L(f, t_L) = \frac{\overline{G_L}}{\overline{I}(f, t_L)}$$

which may then be used by the ICC estimator to calculate the rank-L SINR for each frequency band as $$SINR_L(f,t_L) = p(f,t_L)BF_L GINR_L(f,t_L)$$

where $BF_L$ is the beamforming gain due to using a rank-L precoder. The total ICC for rank-L transmission can then be calculated by mapping the SINR for each frequency bin to the corresponding information capacity for the target block error rate, e.g., using the Shannon capacity formula for an additive white Gaussian channel and error-free reception, the total ICC is given by $$ICC_L = \sum_f \log(1 + SINR_L(f, t_L))$$

Rank selection is performed by comparing the computed ICC for different rank hypothesis and selecting the transmission rank $\hat{L}$ that yields the maximum ICC, i.e., $$\hat{L} = \underset{L}{\operatorname{argmax}}\ ICC_L$$

The optimum rank L and the associated selected precoder $W_{\hat{L}}$ may be signaled to the WD 22 to be used for its next uplink transmission.

Precoder selection may be done for each rank hypothesis as shown in FIG. 5. The functionality of the precoder selection block is to select the optimal precoder that maximizes some relevant performance metric and compute the associated beamforming gain, $BF_L$, due to using this precoder to be used by the ICC estimator to calculate the SINR and total ICC. Three precoder selection algorithms that optimize different relevant performance metrics are presented below.

1. Maximum Total ICC Precoding Selector
Given the instantaneous N×M channel of each frequency bin, H(f,t), and the transmission power of the WD 22 on frequency bin f and the last rank-L uplink transmission time $t_L$, an algorithm for selecting the optimum precoder $W_L$ for the rank-L hypothesis is given by
  For each precoder $W_{i,L} \in \Omega_L$
    For each frequency bin f
      Compute the N×L effective channel $\tilde{H}_{i,L}(f) = \sqrt{p(f,t_L)}H(f)\ W_{i,L}$
      Compute the N×N received signal Covariance Matrix $$C_{i,L}(f) = \tilde{H}_{i,L}(f)\tilde{H}_{i,L}^H(f) + R_{IpN}(f)$$

where $R_{IpN}(f)$ is the N×N interference-plus-noise covariance on subband f
      For each layer k=1, . . . , L
        Compute the output signal to signal-plus-interference-plus-noise ratio for layer k as $$\rho_{i,k}^{(L)}(f) = [\tilde{H}_{i,L}^H(f)C_{i,L}^{-1}(f)\tilde{H}_{i,L}(f)]_{k,k}$$

where $[X]_{k,k}$ is the (k,k) element of the matrix X
        Compute the SINR of layer k as $$\gamma_{i,k}^{(L)}(f) = \frac{\rho_{i,k}^{(L)}(f)}{1 - \rho_{i,k}^{(L)}(f)}$$

Map the SINR to ICC, e.g., using Shannon capacity $\eta_{i,k}^{(L)}(f) = \log_2(1+\gamma_{i,k}^{(L)}(f))$
      End For each layer k=1, . . . , L
    End For each frequency bin f
    Compute the total ICC of precoder $W_{i,L}$ as $\eta_i^{(L)} = \sum_f \sum_{k=1}^L \eta_{i,k}^{(L)}(f)$
  End For each precoder $W_{i,L} \in \Omega_L$
  Select the optimum precoder for hypothesis L, $W_L$ that yields the highest accumulated ICC, i.e., $$W_L = \underset{i}{\operatorname{argmax}}\ \eta_i^{(L)}$$

2. Maximum Received Power Precoding Selector
The following precoding selection algorithm utilizes the uplink transmit covariance matrix to compute the optimal precoder that maximizes the total received power in all layers at the WD 22. The M×M instantaneous uplink transmit covariance matrix is computed as $$\tilde{R}(t_L) = \frac{1}{N_{f_L}} \sum_f H^T(f, t_L)H^*(f, t_L)$$

The filtered covariance matrix R is updated using the instantaneous covariance matrix $\tilde{R}(t_L)$, i.e., $$R = \beta R + (1-\beta)\tilde{R}(t_L)$$

where $\beta < 1$ is the forgetting factor which is calculated based on the required effective memory of the filtering operation and the time elapsed since the last filtered covariance matrix update.

For a given rank hypothesis L, the precoder selection is done using the filtered covariance matrix to maximize the sum of received powers over all layers, i.e., $$W_L = \underset{W_i \in \Omega_L}{\operatorname{argmax}}\ tr\{W_{i,L}^H R W_{i,L}\}$$

where the maximization is done over all the M×L candidate precoding matrices $W_{i,L}$ that belong to the rank-L codebook $\Omega_L$.

3. Low Complexity Wideband ICC Precoding Selector
Given the M×M filtered transmit covariance matrix R, and the average wideband IPN estimate $\bar{I}(t_L)$, the algorithm approximates the interference-plus-noise covariance matrix as $R_{IpN} = \bar{I}(t_L)I$. The algorithm for selecting the optimum rank-L precoder is given by
  For each precoder $W_{i,L} \in \Omega_L$
    Compute the L×L effective channel covariance $\tilde{R}_{i,L} = \bar{P}(t_L)W_{i,L}^T R\ W_{i,L}^*$ For layer k=1, . . . , L
  The output signal to signal-plus-interference-plus-noise ratio for layer k which is given by $$\rho_{i,k}^{(L)} = [\delta_{IpN}^{-1} \tilde{H}_{i,L}^H(f) \tilde{H}_{i,L}(f) - \delta_{IpN}^{-1} \tilde{H}_{i,L}^H \tilde{H}(f) H_{i,L}(f) (\delta_{IpN} I_{L \times L} + \tilde{H}_{i,L}^H(f) \tilde{H}_{i,L}(f))^{-1} \tilde{H}_{i,L}^H(f) \tilde{H}_{i,L}(f)]_{k,k}$$

is approximated by using $\tilde{R}_{i,L}$ instead of $\tilde{H}_{i,L}^H(f)\tilde{H}_{i,L}(f)$, i.e., $$\rho_{i,k}^{(L)}(f) \cong [\delta_{IpN}^{-1} \tilde{R}_{i,L} - \delta_{IpN}^{-1} \tilde{R}_{i,L} (\delta_{IpN} I + \tilde{R}_{i,L})^{-1} \tilde{R}_{i,L}]_{k,k}$$

Compute the SINR of layer k as $$\gamma_{i,k}^{(L)} = \frac{\rho_{i,k}^{(L)}}{1 - \rho_{i,k}^{(L)}}$$

Map the SINR to ICC, e.g., using Shannon capacity
    $\eta_{i,k}^{(L)} = \log_2(1 + \gamma_{i,k}^{(L)})$
  End For layer k=1, . . . , L
  Compute the wideband ICC precoder $W_{i,L}$ as
    $\eta_i^{(L)} = \sum_{k=1}^{L} \eta_{i,k}^{(L)}$
End For each precoder $W_{i,L} \in \Omega_L$
Select the optimum precoder for hypothesis L, $W_L$ that yields the highest accumulated ICC, i.e., $$W_L = \underset{i}{\mathrm{argmax}}\; \eta_i^{(L)}$$

Returning to FIG. 5, a purpose of the rank restriction block is to limit the rank hypotheses to those that can be supported by the wireless communication channel. This may be achieved by using a spatial support test for each possible rank hypothesis to determine whether the uplink channel has enough significant eigen modes to support this transmission rank. For example, let $\lambda_0, \lambda_1, \ldots, \lambda_{M-1}$ denote the eigenvalues (in descending order) of the filtered covariance matrix R. The channel has enough significant eigen modes to support rank L hypothesis if $$\frac{\lambda_0}{\lambda_{L-1}} \leq \gamma$$

where $\gamma$ is a pre-determined threshold on the eigenvalue spread of the covariance matrix. Hence, this test indicates whether different layers can be spatially received at the cell receiver without significant residual inter-layer interference.

Since the ICC estimation unit 32 associated with each uplink transmission rank may be updated frequently enough to enable tracking of the estimated GINR, $GINR_L(f,t_L)$, associated with this rank hypothesis, rank polling may be used to force the uplink transmission to a certain number of layers and override the rank selection algorithm. For example, a timer can be associated with each allowed rank L where the timer is set to zero each time an uplink transmission is received with L layers. If the timer expires; the rank of the next rank transmission is forced to L.

The performance of the uplink SU-MIMO precoding technique can be evaluated using system-level simulations. In one example, a 5G cellular system with bandwidth 30 MHz and carrier frequency 3.5 GHz is simulated and the system is simulated to operate in time division duplex mode where the Downlink/Uplink timeslot pattern is 3/1. A 7-site deployment scenario is assumed where each site has 3 cells, the inter-site distance is equal to 500 meters and the WDs are dropped randomly in the simulation area. All the WDs 22 are assumed to have fully coherent uplink transmission capabilities where the number of uplink transmission antennas is equal to 4.

A 5G SCM Urban Macro channel model with NLOS communication may be used. The antenna configuration at the network node 16 may be the AAS AIR 6488 (4×8×2) configuration. For some embodiments, the traffic model for the uplink is selected as full buffer. The channel estimates may be obtained using a full band 4-Port sounding reference symbol which is transmitted by the WD 22 every 2.5 msec. The performances of the precoding algorithms described herein using 3GPP Rel.15 uplink codebook are compared. Consider fixed rank selection with 1, 2, and 4 layers as well as adaptive rank selection where rank polling is done every 1 second. As a benchmark for comparison, a legacy uplink transmission scheme where each scheduled WD 22 transmits from Port 0 with full available power is included.

Figure 7:
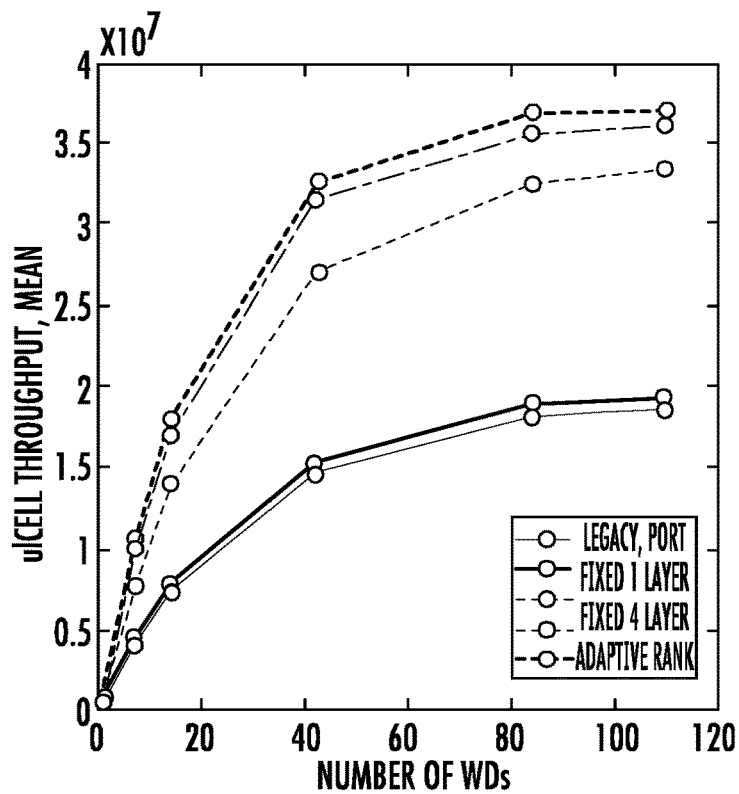
FIG. 7 shows the average of the uplink WD throughput versus the number of WDs in the simulation area.
Figure 8:
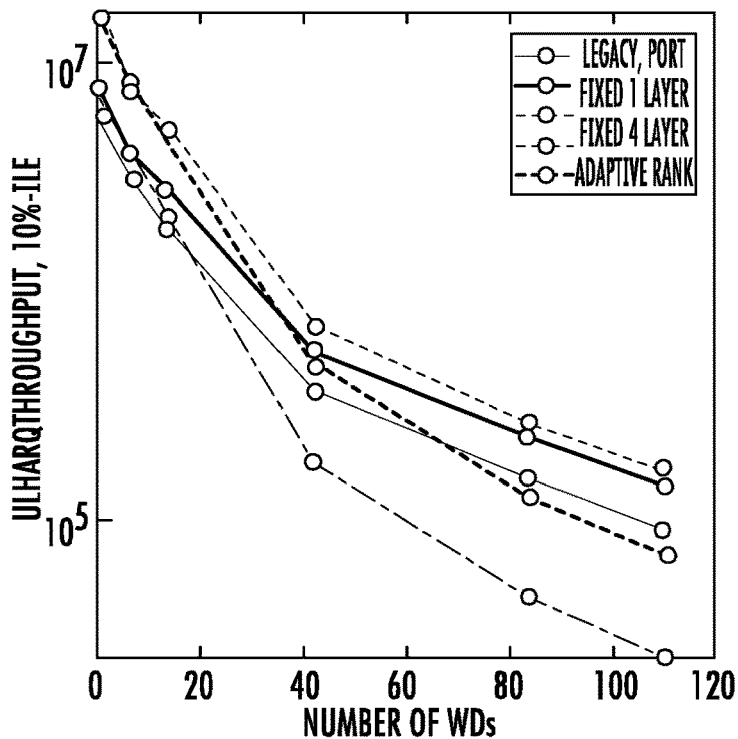
FIG. 8 shows the $10^{th}$ percentile of the uplink WD throughput versus the number of WDs in the simulation area.

FIG. 7 and FIG. 8 show respectively the average and $10^{th}$ percentile of the uplink WD 22 throughput versus the number of WDs 22 in the simulation area. As can be seen from FIG. 7, 4-Layer UL SU-MIMO offers 100% improvement in cell throughput over legacy transmission due to its spatial multiplexing capability. As can be seen from FIGS. 7 and 8, the adaptive rank selection algorithm described herein may yield a high cell throughput without severely degrading cell edge throughput, i.e., the number of layers for each WD 22 are properly selected based on its channel conditions Thus, in some embodiments, arrangements and methods are provided for uplink SU-MIMO codebook-based precoding selection in wireless communication systems. Computationally-efficient algorithms for rank adaptation and precoding selection are presented that perform precoding selection using the uplink transmit covariance matrix and perform rank selection by mapping the estimated signal to interference-plus-noise (SINR) of each rank hypothesis to a corresponding ICC estimate and selecting the rank hypothesis that yields the highest ICC. An SU-MIMO link adaptation algorithm that supports multiple uplink layers by using multiple ICC estimators together with periodic polling to ensure accurate ICC estimation for each rank hypothesis are provided.

According to one aspect, a method in a network node 16 for single user multiple input multiple output, SU-MIMO, codebook-based precoder selection and for rank adaptation is provided. The method includes, for each one of a plurality of rank hypotheses: selecting a precoder matrix based on an uplink transmit covariance matrix; and estimating a respective information carrying capacity, ICC, for the rank hypothesis based at least in part on the selected precoder matrix. The method further includes selecting an uplink single user multiple input multiple output, SU-MIMO, precoding matrix based at least in part on the estimated ICC for each rank hypothesis.

According to this aspect, in some embodiments, the ICC estimation includes determining an average signal to interference and noise ratio, SINR, of an uplink transmission by averaging an estimated SINR over a plurality of active frequency bands and layers. In some embodiments, estimation of the estimated SINR includes subtracting a received signal power from a total received power. In some embodiments, the method further includes determining a total ICC for a rank by mapping a signal to interference plus noise ratio, SINR, for each of a plurality of frequencies to the ICC corresponding to a rank for a target block error rate. In some embodiments, the method further includes selecting a rank hypothesis that provides a largest ICC upon which to base selection of the SU-MIMO precoding matrix. In some embodiments, the method further includes transmitting the selected rank hypothesis and associated selected SU-MIMO precoding matrix to a wireless device. In some embodiments, the method further includes determining a beam forming gain obtained from use of a precoder matrix to determine the ICC. In some embodiments, a precoder matrix is selected to maximize a performance measure according to an objective criterion. In some embodiments, the plurality of rank hypotheses are limited based on a spatial support test. In some embodiments, rank polling is applied to force an uplink transmission to a certain number of layers.

According to another aspect, a network node 16 is configured for single user multiple input multiple output, SU-MIMO, codebook-based precoder selection and for rank adaptation. The network node 16 includes processing circuitry configured to: for each one of a plurality of rank hypotheses: select a precoder matrix based on an uplink transmit covariance matrix; and estimate a respective information carrying capacity, ICC, for the rank hypothesis based at least in part on the selected precoder matrix. The processing circuitry is further configured to select an uplink single user multiple input multiple output, SU-MIMO, precoding matrix based at least in part on the estimated ICC for each rank hypothesis.

According to this aspect, in some embodiments, the ICC estimation includes determining an average signal to interference and noise ratio, SINR, of an uplink transmission by averaging an estimated SINR over a plurality of active frequency bands and layers. In some embodiments, estimation of the estimated SINR includes subtracting a received signal power from a total received power. In some embodiments, the processing circuitry is further configured to determine a total ICC for a rank by mapping a signal to interference plus noise ratio, SINR, for each of a plurality of frequencies to the ICC corresponding to a rank for a target block error rate. In some embodiments, the processing circuitry is further configured to select a rank hypothesis that provides a largest ICC upon which to base selection of the SU-MIMO precoding matrix. In some embodiments, the processing circuitry is further configured to transmit the selected rank hypothesis and associated selected SU-MIMO precoding matrix to a wireless device. In some embodiments, the processing circuitry is further configured to determine a beam forming gain obtained from use of a precoder matrix to determine the ICC. In some embodiments, a precoder matrix is selected to maximize a performance measure according to an objective criterion. In some embodiments, the plurality of rank hypotheses are limited based on a spatial support test. In some embodiments, rank polling is applied to force an uplink transmission to a certain number of layers.

According to yet another aspect, a method in a network node 16 for single user multiple input multiple output, SU-MIMO, codebook-based precoder selection and for rank adaptation is provided. The method includes, for each one of a plurality of rank hypotheses selected based on a spatial support test: selecting a precoder matrix based on an uplink transmit covariance matrix; and estimating a respective information carrying capacity, ICC, for the rank hypothesis based at least in part on the selected precoder matrix. The method further includes selecting an uplink single user multiple input multiple output, SU-MIMO, precoding matrix corresponding to an estimated ICC having a largest value. The method also includes transmitting to a wireless device a rank hypothesis corresponding to an estimated ICC having a largest value.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Java® or C++.

However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| AAS | Adaptive Antenna System |
| CSI | Channel State Information |
| GINR | Gain to interference-plus-noise ratio |
| gNB | next Generation Node B |
| ICC | Information Carrying Capacity |
| LTE | Long Term Evolution |
| MIMO | Multiple Input Multiple Output |
| NLOS | Non-Line of Sight |
| SINR | Signal to Interference-plus-Noise Ratio |
| SU | Single-User |
| TDD | Time Division Duplex |
| UE | User Equipment |
| WD | Wireless Device |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method in a network node for single user multiple input multiple output (SU-MIMO) codebook-based precoder selection and for rank adaptation, the method comprising:
   determining, for each of a plurality of rank hypotheses, whether the rank hypothesis has spatial support for a number of eigenvalues of an uplink covariance matrix;
   for each one of the supported rank hypotheses:
      selecting a precoder matrix based on an uplink transmit covariance matrix; and
      estimating a respective information carrying capacity (ICC) for the supported rank hypothesis based at least in part on the selected precoder matrix; and
   selecting an uplink SU-MIMO precoding matrix based at least in part on the estimated ICC for each supported rank hypothesis.

2. The method of claim 1, wherein the ICC estimation includes determining an average signal to interference and noise ratio (SINR) of an uplink transmission by averaging an estimated SINR over a plurality of active frequency bands and layers.

3. The method of claim 2, wherein the estimated SINR is determined by: calculating an interference-plus noise (IPN) power by subtracting a received signal power from a total received power, temporal filtering and frequency averaging the IPN power, and calculating the estimated SINR using the filtered and averaged IPN power, a channel gain, and a beamforming gain.

4. The method of claim 1, further comprising determining a total ICC for a rank by mapping a signal to interference plus noise ratio (SINR) for each of a plurality of frequencies to the ICC corresponding to a rank for a target block error rate.

5. The method of claim 1, further comprising selecting a supported rank hypothesis that provides a largest ICC upon which to base selection of the SU-MIMO precoding matrix.

6. The method of claim 5, further comprising transmitting the selected rank hypothesis and associated selected SU-MIMO precoding matrix to a wireless device.

7. The method of claim 1, further comprising determining a beam forming gain obtained from use of a precoder matrix to determine the ICC.

8. The method of claim 1, wherein a precoder matrix is selected to maximize a performance measure according to an objective criterion.

9. The method of claim 1, wherein the plurality of supported rank hypotheses are limited based on a spatial support test.

10. The method of claim 1, wherein rank polling is applied to force an uplink transmission to a certain number of layers.

11. A network node configured for single user multiple input multiple output (SU-MIMO) codebook-based precoder selection and for rank adaptation, the network node comprising processing circuitry configured to:
   determine, for each of a plurality of rank hypotheses, whether the rank hypothesis has spatial support for a number of eigenvalues of an uplink covariance matrix;
   for each one of the supported rank hypotheses:
      select a precoder matrix based on an uplink transmit covariance matrix; and
      estimate a respective information carrying capacity (ICC) for the supported rank hypothesis based at least in part on the selected precoder matrix; and
   select an uplink SU-MIMO precoding matrix based at least in part on the estimated ICC for each supported rank hypothesis.

12. The network node of claim 11, wherein the ICC estimation includes determining an average signal to interference and noise ratio (SINR) of an uplink transmission by averaging an estimated SINR over a plurality of active frequency bands and layers.

13. The network node of claim 12, wherein the estimated SINR is determined by: calculating an interference-plus noise (IPN) power by subtracting a received signal power from a total received power, temporal filtering and frequency averaging the IPN power, and calculating the estimated SINR using the filtered and averaged IPN power, a channel gain, and a beamforming gain.

14. The network node of claim 11, wherein the processing circuitry is further configured to determine a total ICC for a rank by mapping a signal to interference plus noise ratio (SINR) for each of a plurality of frequencies to the ICC corresponding to a rank for a target block error rate.

15. The network node of claim 11, wherein the processing circuitry is further configured to select a supported rank hypothesis that provides a largest ICC upon which to base selection of the SU-MIMO precoding matrix.

16. The network node of claim 15, wherein the processing circuitry is further configured to cause transmission of the selected rank hypothesis and associated selected SU-MIMO precoding matrix to a wireless device.

17. The network node of claim 11, wherein the processing circuitry is further configured to determine a beam forming gain obtained from use of a precoder matrix to determine the ICC.

18. The network node of claim 11, wherein a precoder matrix is selected to maximize a performance measure according to an objective criterion.

19. The network node of claim 11, wherein the supported rank hypotheses are limited based on a spatial support test.

20. The network node of claim 11, wherein rank polling is applied to force an uplink transmission to a certain number of layers.

21. A method in a network node for single user multiple input multiple output (SU-MIMO) codebook-based precoder selection and for rank adaptation, the method comprising:
- determining, for each of a plurality of rank hypotheses, whether the rank hypothesis has spatial support for a number of eigenvalues of an uplink covariance matrix;
- for each one of the supported rank hypotheses selected based on a spatial support test:
  - selecting a precoder matrix based on an uplink transmit covariance matrix; and
  - estimating a respective information carrying capacity (ICC) for the supported rank hypothesis based at least in part on the selected precoder matrix;
- selecting an uplink SU-MIMO precoding matrix corresponding to an estimated ICC having a largest value; and
- transmitting to a wireless device a supported rank hypothesis corresponding to an estimated ICC having a largest value.

* * * * *